(No Model.)

O. F. COOK.
MEANS FOR LUBRICATING SHAFT BEARINGS.

No. 603,260. Patented May 3, 1898.

Witnesses
J. Haut Culverwell.
Edwin Cruse.

Inventor
Oren F. Cook
By his Attorneys,
C. A. Snow & Co.

UNITED STATES PATENT OFFICE.

OREN F. COOK, OF SAN JOSÉ, CALIFORNIA.

MEANS FOR LUBRICATING SHAFT-BEARINGS.

SPECIFICATION forming part of Letters Patent No. 603,260, dated May 3, 1898.

Application filed October 12, 1897. Serial No. 654,967. (No model.)

*To all whom it may concern:*

Be it known that I, OREN F. COOK, a citizen of the United States, residing at San José, in the county of Santa Clara and State of California, have invented a new and useful Means for Lubricating Shaft-Bearings, of which the following is a specification.

This invention relates to shaft-bearings, its object being to so improve the construction thereof that with the aid of a force-pump and suitable pipe connections between the pump, the bearing, and a supply of lubricant I am enabled to introduce the lubricant into the bearing below the shaft under a pressure sufficient to elevate the shaft out of metallic contact with the lower section of the bearing and maintain a constant circulation of lubricant through the bearing around the shaft, and thus form a thin film of lubricant between the metal of the shaft and the bearing, thereby preventing actual metallic contact between them when the shaft is revolved.

The invention also contemplates provision for the discharge of the lubricant out through the cap of the bearing with sufficient freedom to prevent downward pressure on the shaft and the return of such lubricant to the source of supply. I also provide suitable means to prevent the escape of the lubricant at the ends of the bearing, and thereby maintain a constant upward pressure upon the shaft and also prevent the waste of the lubricant.

The invention will be fully described in the following description and its novel features clearly defined in the subjoined claim.

Figure 1:
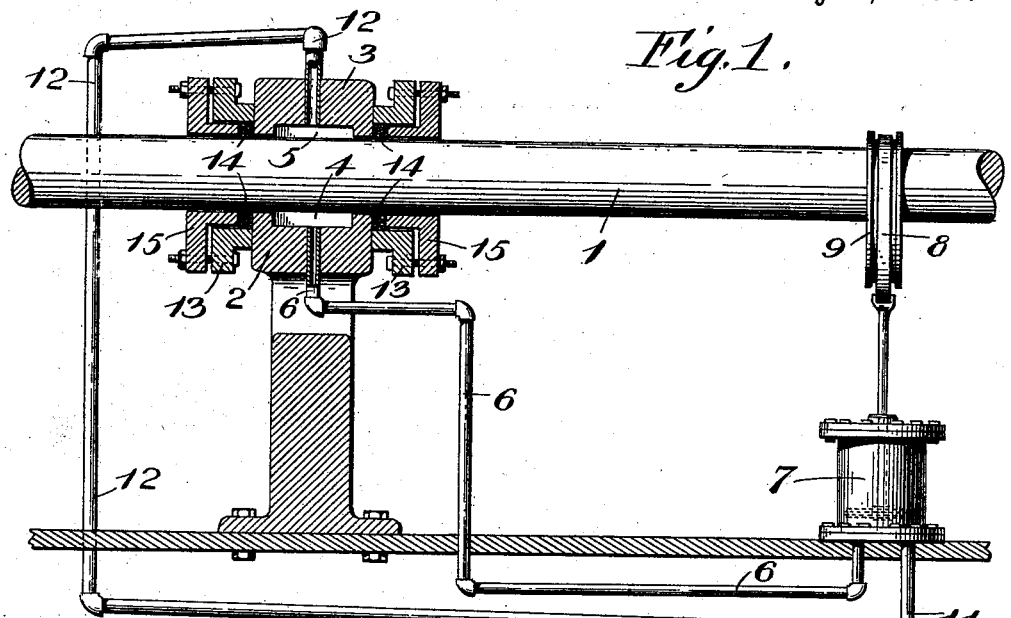
Figure 2:
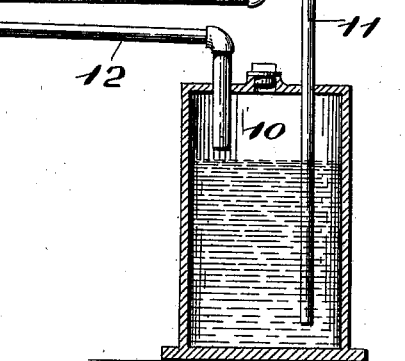

In the drawings, Figure 1 is a side elevation, partly in section, of a shaft and a bearing embodying my invention, together with the force-pump and pipe connections. Fig. 2 is a vertical transverse section through the shaft and bearing.

Similar reference-numerals indicate similar parts in both figures.

1 indicates the shaft, 2 the lower section of the bearing, and 3 the upper or cap section thereof. Each section is provided interiorly with a recess or chamber, the one in the lower chamber being indicated by 4 and that in the upper chamber by 5, and these chambers are of substantially equal dimensions and are in vertical alinement with each other.

6 indicates a pipe leading from the chamber 4 to the force-pump 7, the piston-rod of which is connected to the strap 8 of an eccentric 9 on the shaft 1. A tank or reservoir 10 is provided to contain a supply of lubricant, and a pipe 11 leads from the tank to the pump.

12 indicates a pipe leading from the chamber 5 to the tank and serves to return the lubricant from the chamber to the tank. This pipe will be of somewhat greater diameter than the supply-pipe in order that the lubricant may escape freely from the chamber 5, into which it will be forced under pressure and thus avoid downward pressure on the shaft. The chambers 4 and 5 have their greatest length longitudinally of the shaft and are of a materially less width than the diameter of the shaft, so as to be open only to the shaft and to the supply and discharge pipes, respectively.

A stuffing-box 13 is provided at each end of the bearing to receive a suitable packing 14, and a follower 15 is adjustable in the usual manner to compress the packing and thereby prevent the escape of the lubricant at the ends of the bearing. By this arrangement the lubricant will be compelled to force its way around the shaft from the lower to the upper chamber and thence back to the reservoir through the pipe 12.

From the foregoing description it will be obvious that when the pump is operated the lubricant will accumulate in the lower chamber under sufficient pressure to lift the shaft out of metallic contact with the lower section of the bearing and will then be forced up around the shaft into the upper chamber, from which it will be free to escape to the tank. A thin film of lubricant will therefore be constantly maintained between the metal of the shaft and the bearing as long as the pump is operated, and there will be very little friction on the shaft in the bearing to retard its lubricant. It is also obvious that by the use of the stuffing-boxes the lubricant is prevented from escaping from the ends of the bearing, and consequently the entire pressure of the lubricant is exerted in an upward direction.

I have illustrated my invention as applied to a single bearing; but it is obvious that adjacent bearings may be supplied with lubricant from the same pump by having branch pipes lead from the supply and return pipes to the several bearings.

It will be understood that changes in the form, proportion, and the minor details of construction may be resorted to without departing from the spirit or sacrificing any of the advantages of this invention.

Having thus described the invention, what I claim is—

The combination with a horizontal shaft, of a bearing-box provided at its ends with stuffing-boxes and having formed respectively in the upper and lower sides of its bore, and in the same vertical plane, oil chambers or pockets disposed longitudinally of the shaft and of a materially less width than the diameter of the latter, whereby the shaft will form a loose closure for the open sides of said chambers or pockets, an oil-inlet pipe arranged to deliver oil under pressure to the lower of said chambers or pockets, and an oil-outlet pipe communicating with the upper of said chambers or pockets and of a greater diameter than said inlet-pipe, substantially as set forth.

In testimony that I claim the foregoing as my own I have hereto affixed my signature in the presence of two witnesses.

OREN F. COOK.

Witnesses:
C. H. SIMONDS,
JOHN VARCOE.